(12) United States Patent
Allyn

(10) Patent No.: US 10,102,419 B2
(45) Date of Patent: Oct. 16, 2018

(54) PROGRESSIVE RADAR ASSISTED FACIAL RECOGNITION

(71) Applicant: Intel Corporation, Santa Clara, CA (US)

(72) Inventor: Mark A Allyn, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 222 days.

(21) Appl. No.: 14/927,739

(22) Filed: Oct. 30, 2015

(65) Prior Publication Data

US 2017/0124384 A1    May 4, 2017

(51) Int. Cl.
| | |
|---|---|
| *G01S 13/86* | (2006.01) |
| *G06K 9/00* | (2006.01) |
| *G01S 13/89* | (2006.01) |
| *G06K 9/20* | (2006.01) |
| *G01S 7/40* | (2006.01) |

(52) U.S. Cl.
CPC ........ *G06K 9/00255* (2013.01); *G01S 13/867* (2013.01); *G01S 13/89* (2013.01); *G06K 9/2018* (2013.01); *G01S 2007/4013* (2013.01)

(58) Field of Classification Search
CPC .. G06K 9/00255; G06K 9/2018; G01S 13/89; G01S 2007/4013
See application file for complete search history.

(56) References Cited

U.S. PATENT DOCUMENTS

| | | | | |
|---|---|---|---|---|
| 6,442,465 | B2* | 8/2002 | Breed | B60J 10/00 |
| | | | | 280/734 |
| 7,362,884 | B2* | 4/2008 | Willis | G06K 9/00892 |
| | | | | 340/5.82 |
| 8,433,103 | B2* | 4/2013 | Friedman | G06K 9/00604 |
| | | | | 382/116 |
| 9,224,057 | B2* | 12/2015 | Bertin | G06F 21/32 |
| 2005/0084179 | A1* | 4/2005 | Hanna | G06K 9/00604 |
| | | | | 382/294 |
| 2005/0110672 | A1* | 5/2005 | Cardiasmenos | G01N 21/3581 |
| | | | | 342/27 |
| 2006/0125679 | A1* | 6/2006 | Horibe | G01S 17/023 |
| | | | | 342/52 |
| 2006/0228005 | A1* | 10/2006 | Matsugu | G06K 9/00362 |
| | | | | 382/116 |
| 2009/0002220 | A1* | 1/2009 | Lovberg | G01S 13/89 |
| | | | | 342/33 |
| 2012/0116202 | A1* | 5/2012 | Bangera | A61B 5/0507 |
| | | | | 600/407 |

(Continued)

Primary Examiner — Peter M Bythrow
(74) Attorney, Agent, or Firm — Schwegman Lundberg & Woessner, P.A.

(57) ABSTRACT

System and techniques for progressive radar assisted facial recognition are described herein. An image may be obtained from a camera of the security device. A facial target in the image may be identified. The facial target may include a non-empty set of positive facial indicators and also be missing a non-empty set of facial indicators used for identification. In response to identifying the facial target, a power level of a millimeter wave radar may be increased at least until a threshold number of members of the set of facial indicators are observed. Then, the members of the set of facial indicators that are observed may be combined with the set of positive indicators of the face to create a composite image.

24 Claims, 4 Drawing Sheets

(56) References Cited

U.S. PATENT DOCUMENTS

2015/0356351 A1* 12/2015 Saylor .................. G01S 17/89
  348/164
2016/0080642 A1* 3/2016 Jung .................... G11B 19/02
  386/227

* cited by examiner

PROGRESSIVE RADAR ASSISTED FACIAL RECOGNITION

TECHNICAL FIELD

Embodiments described herein generally relate to computer vision and more specifically to progressive radar assisted facial recognition.

BACKGROUND

Computer vision encompasses a number of devices and techniques to enable computers to process visual information for useful tasks. Such tasks may include navigation, object classification, security, and so on. Security tasks may include identifying people or objects within an image or sequence of images that are significant within a security context. An example may include a piece of luggage left in a transit terminal for an extended period of time.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

DETAILED DESCRIPTION

Security cameras may use computer vision techniques to enhance the value of, for example, security videos my identifying people or things within a context. Although image processing techniques may be able to identify a human face from a clear image, issues may arise when the face is partially or wholly obscured by, for example, clothing, masks, or shadows. As used herein, images captured with a camera (e.g., optical camera) are of the visual spectrum (e.g., light generally perceivable by a human).

Millimeter wave radar may be combined with visual spectrum images to fill in details of a face that are obscured by clothing, shadow, etc. In contrast to visual spectrum cameras, which are generally passive, millimeter wave radar devices are active, emitting photons and recording reflections of those photons from the environment. This emission may drain power, may alert malicious actors as to the presence of the radar, and may cause concern among the public. To address these issues, the millimeter wave radar may be used when the system determines that the visual spectrum images are insufficient. In an example, the millimeter wave radar may start at a low power threshold and incrementally increase its power until a sufficient number of facial indicators have been measured. In this manner, the technical deficiencies in visual light spectrum imaging alone for visual facial recognition may be overcome via progressive assistance of millimeter wave radar while reducing power consumption, alerting malicious actors, and mitigation public concern about electromagnetic radiation.

Figure 1:
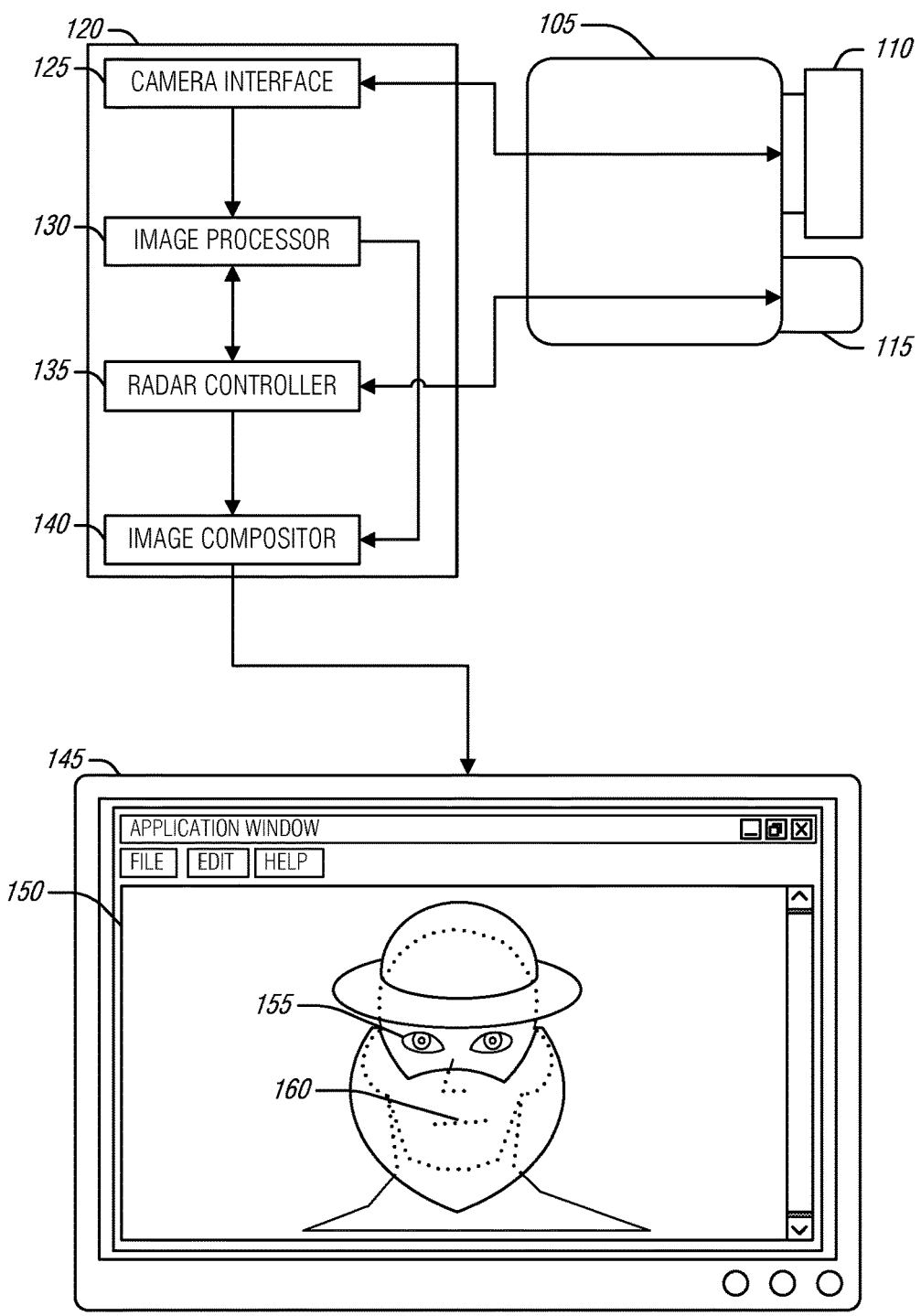
FIG. 1 is a block diagram of an example of an environment including a component for progressive radar assisted facial recognition, according to an embodiment.

FIG. 1 is a block diagram of an example of an environment 100 including a component 120 for progressive radar assisted facial recognition, according to an embodiment. The environment 100 includes a security device 105 housing a camera 110 (e.g., visual light spectrum imager) and a millimeter wave radar 115. The environment 100 may also include an output device 145 to receive the output from the component 120.

Although the security device 105 is illustrated as housing both the camera 110 and the millimeter wave radar 115, embodiments may include various arrangements of these devices, including being in separate housings and communicatively (e.g., wired or wirelessly) coupled to each other or simply to the component 120. In an example, the component 120 is also contained within a housing of the security device 105 to create a composite device. In an example, the security device 105 or the composite device may operate without mains power. Such operation may include receiving power from solar panels, from a wind generator, inductive power (e.g., wireless transmission of power via magnetic field fluctuation), from a fuel cell (e.g., a hydrogen fuel cell) or other chemical device to create electricity, among other alternatives to mains power. In an example, the security device 105 or the composite device may be powered by a battery.

The security device 105 may be mounted in a space, such as a transit terminal, office, etc., or in another device, such as a secure door, vending kiosk, etc., and positioned so as to observed an area pertinent to a particular security context. For example, in a transit terminal, the security device 105 may be positioned so as to observe people at a ticketing counter. The camera 110 and the millimeter wave radar 115 are positioned such that the field of view for the millimeter wave radar 115 at least overlaps a defined field of view for the camera 110 pertinent to the security context. In an example, the field of view for the millimeter wave radar 115 completely overlaps the field of view for the camera 110.

The component 120 may include several computer hardware implemented components, including a camera interface 125, an image processor 130, a radar controller 135, and an image compositor 140. Example computer hardware structures used to implement these components are described below with respect to FIG. 4, including circuit sets.

The camera interface 125 may be arranged to obtain an image from the camera 110. In an example, to obtain the image, the camera interface 125 includes a hardware interface to retrieve the image from an output interface of the camera 110. In this example, the camera interface 125 may be arranged to control the camera 110, for example, to capture an image, adjust image capture settings (e.g., exposure, framerate, etc.), or power on or power off the camera 110. In an example, to obtain the image, the camera interface 125 includes a hardware interface to which the image is delivered, such as a memory buffer, control line, etc. As noted above, the image, or a set of images including the image, are visual spectrum light (e.g., optical) images of visual spectrum light reflecting off of a scene including a subject. Images obtained by the camera interface 125 may be delivered to the image processor 130.

The image processor 130 may be arranged to identify a facial target in the image. As used herein, the facial target is made up of a non-empty set of positive facial indicators and is missing a non-empty set of facial indicators used for identification. Thus, the positive facial indicators may be part of the data used to perform facial recognition, but successful facial recognition will use one or more of the missing facial indicators.

As used herein, facial indicators may include a variety of discernable elements from images that are used in facial recognition by a computer vision system. Example facial indicators may include lines (e.g., mouth line, discrete segments of a jaw, etc.), shapes (e.g., a facial template, oval corresponding to a face, eye, nostril, etc.), textures (e.g., human skin, hair, woven fabric, plastic, leather, etc.), whole structures (e.g., eyes, ears, nose, mouth, hairline, etc.), relations between other facial indicators (e.g., distance between eyes, angle between eyes and nose or mouth, etc.), among others. The image processor 130 may employ a variety of mechanisms to ascertain the positive facial indicators. For example, the image processor 130 may use an artificial intelligence (e.g., neural network) classifier to identify whole structures. The image processor 130 may employ a variety of line, or other shape detection mechanisms, such as various Hough transforms, to extract edge based features from the image.

The image processor 130 may include a parameter set specifying a number and type of facial indicators for successful facial recognition. By comparing members of the set of positive facial indicators and finding other facial indicators are specified in the parameter set, the image processor 130 determines that there are missing facial indicators. As noted above, the missing facial indicators may be obscured by an object (e.g., a hood, hat, mask, facial hair, etc.) or shadow (e.g., insufficient visible spectrum light reflecting off of a portion of the subject's face. In an example, the image processor 130 may identify target regions where the missing facial indicators may be found. Such identification may include ascertaining a general outline of a face and noting area in which an expected feature (e.g., a mouth) are not found within the outline. In an example, regions ascertained to not be human skin within the facial outline may be identified as target regions. Non-human skin may be determined by the image processor as having a texture inconsistent with a known texture for human skin, such as may be seen in the "rough" nature of woven fabrics. Similarly, some synthetic materials, such as latex, may be too smooth (e.g., flat, without bumps, etc.) to be consistent with human skin. Other skins, such as various leathers, may include an identifiable grain, or lack small hairs consistent with live human skin.

After identifying the existence of the set of missing facial indicators, the image processor 130 may communicate with, or command, the radar controller 135 to increase a power level of the millimeter wave radar 115 to capture a millimeter wave radar image. Millimeter wave radar images have resolutions in the millimeter range and may supply the missing facial indicators. As noted above, because the millimeter wave radar 115 is an active imaging device, using it increases power output. This may be burdensome when the security device 105 is not using mains power. Further, a malicious party may be able to detect the radar emissions and known to avoid such areas. Finally, the public may be concerned with excessive electromagnetic radiation and so constant use of such emissions may initiate public scorn. Accordingly, the radar controller 135 may be arranged to increase the power level of the millimeter wave radar 115 until a threshold number of members of the missing set of facial indicators are observed.

In an example, the radar controller 135 is arranged to maintain an output power level of the millimeter wave radar 115 when not increasing the power level. In an example, the radar controller 135 is arranged to maintain the power level in a powered down state when not directed to increase the power level. Thus, millimeter wave radar 115 emissions are non-existent thwarting malicious party scanning attempts and reducing public anxiety about excessive electromagnetic emissions. Further, powering down the millimeter wave radar 115 saves power, allowing the security device 105 to function longer when not using mains power.

In an example, the radar control 135 may be arranged to increase the power level of the millimeter wave radar 115 in discrete steps. At each step a millimeter wave radar image may be obtained and searched for missing facial indicators. In an example, images captured by the millimeter wave radar 115 and obtained by the radar controller 135 are communicated to the image processor 130 to find additional facial indicators. In an example, the radar controller 135 itself finds the additional the facial indicators using techniques like those described with respect to the image processor 130 but adapted to millimeter wave radar images.

The image compositor 140 may be arranged to combine the members of the set of facial indicators that are observed by the millimeter wave radar with the set of positive indicators of the face to create a composite image. In this example, the composite image may consist of the facial indicators (e.g., lines, shapes, structures, etc.). In an example, the facial indicators of the composite image may be combined with other features, such as textures, backgrounds, etc., from the millimeter wave radar 115 images or from the camera 110 images. In an example, the image compositor is arranged to iteratively accept millimeter wave radar 115 images as the radar controller 135 steps up the millimeter wave radar 115 power level. In an example, the compositing may continue until the image processor 130, the radar controller 135, or the image compositor 140 itself determines that enough of the set of missing facial indicators have been found to satisfy the parameter set for facial recognition. In an example, the compositing will cease after a maximum power level of the millimeter wave radar 115 is achieved. In an example, the maximum power level of the millimeter wave radar 115 is a preset threshold over which the radar controller 135 will not increase the millimeter wave radar 115 power level even though the millimeter wave radar 115 is capable of high output. In an example, the maximum power is a threshold of power over time that the radar controller 135 will not exceed. For example, the millimeter wave radar 115 may be maintained at a high level of power for less time than a lower power level to reach the maximum power exposure level.

In an example, the image processor 130 may be arranged to obtain a plurality of images from the camera 110, the plurality of images including the image. The plurality of images may also contain a set of millimeter wave radar 115 images obtained by the radar controller 135 from the millimeter wave radar 115. In an example, the image processor 130 may be arranged to register members of the plurality of images with each other when they are in sequence (e.g., time stamped by the capture device or the image processor 130, or otherwise orderable such as being stored in a first-in-first-out data structure). Registration includes the fitting of the images such that portions of two different images corresponding to the same space in the environment are correlated to each other. In this way, data from the camera 110 and the millimeter wave radar 115 may be composited by, for example, the image compositor 140 to create composite sub-image sequences. The sub-image sequences may be delimited by a set time period. That is, a sequence consists of the camera 110 and millimeter wave radar 115 images obtained within the time period. Such sequence may be useful when, for example, the frame rate of either the camera 110 or the millimeter wave radar 115 are low. By registering and compositing the various images, a more complete set of facial indicators may be obtained for the facial recognition.

The component 120 outputs the composite image from the image compositor 140 to an external device 145. As illustrated here, the external device 145 is a display device that is displaying a version of the composite image 150. Also, for illustrative purposes, the right eye 155 is an example of a positive facial indicator from the camera 110 while the mouth 160 is an example of a missing facial indicator observed by the millimeter wave radar 115 due to its obstruction by a mask. The external device 145 may be any device that uses images for facial recognition. For example, the external device may be a facial recognition system to facilitate police searching of a database of facial images. By integrating millimeter wave radar 115 images with visual camera 110 images, the component 120 helps to defeat mechanisms employed by people to avoid facial detection. By leaving the millimeter wave radar 115 off until it may fill in details missing from the camera 110 images, and then incrementally increasing the power of the millimeter wave radar 115 only until a specified set of facial features are detectable, the component 120 both frustrates malicious parties seeking to identify the security device 105 using a scanner, but also reduces electromagnetic radiation of the public in general and the subject in particular.

Figure 2:
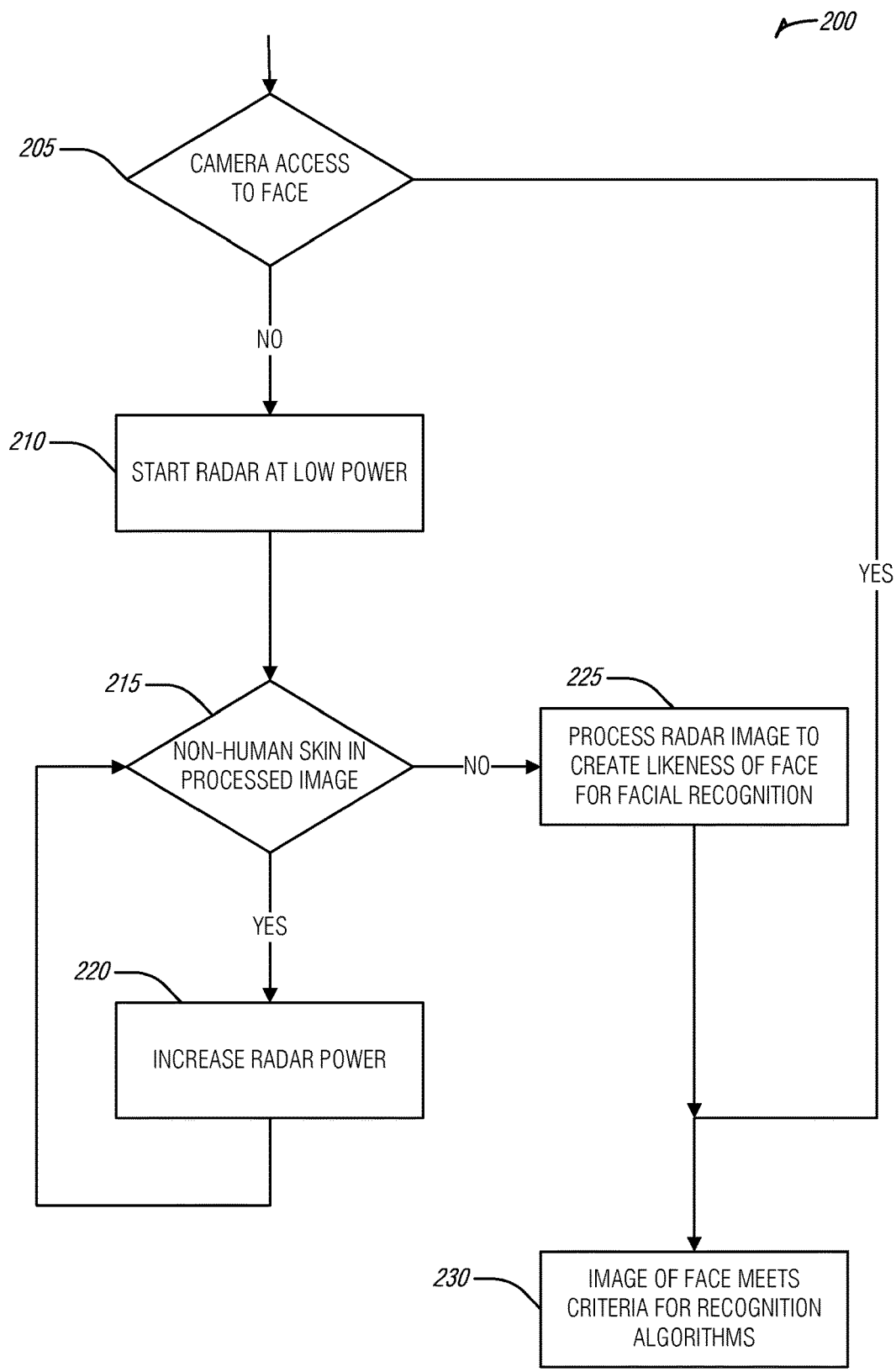
FIG. 2 illustrates a flow diagram of an example of a method for progressive radar assisted facial recognition, according to an embodiment.

FIG. 2 illustrates a flow diagram of an example of a method 200 for progressive radar assisted facial recognition, according to an embodiment. The operations of the method 200 are implemented in computer hardware, such as that described above with respect to FIG. 1, or below with respect to FIG. 4 (e.g., processors, circuit sets, etc.).

The camera image or images may provide whatever physical features are visible (e.g., those not covered by a mask or hood). The camera images may also allow identification, for example, of material (fabrics, leather, plastic, etc.) used for masks, hoods, etc. that are distinctive from those of living of human skin (e.g., the face). These materials characteristics may include surface texture, reflectivity (e.g., of one or more light wavelengths), absorption (e.g., of one or more light wavelengths), etc. Identification of these material characteristics may be used to determine if what is on the image is human skin (e.g., the subject's face) or an obstruction (e.g., mask, hood, etc.) covering the face.

As noted above, the millimeter wave radar may have its emissions power increased over time. This may be done in a stepwise fashion where each level of millimeter wave radar output is discretely increased from a minimum predetermined power threshold via a stepping function for subsequently higher power levels. At each stepped-up power level, the system may determine if there is any skin exposed in the image. Whatever skin is observed at a given level is added to the composite image. This procedure may be iteratively applied to increase millimeter wave radar power, adding to the composite image at each step until the enough facial indicators are exposed for facial recognition to be successfully completed.

The operations described herein may include the following to electronically "peel" away the facial obstructions to create a composite image of the subject face.

At operation 205, determine if there is enough of the visible image useful for facial recognition technologies. If there is, stop and proceed to operation 230. If there is not, proceed to operation 210.

At operation 210, start millimeter wave radar with a low power (e.g., the lowest power setting of the millimeter wave radar) to capture a millimeter wave radar image.

At operation 215, use image processing to identify whether the millimeter wave radar image contains characteristics of obstructive material (e.g., not human skin). If the millimeter wave radar image does not contain obstructive material, or if the composite image is sufficient, proceed to operation 225. Otherwise, proceed to operation 220.

At operation 225, if there is any additional human skin represented in the millimeter wave radar image, composite it with the previously obtained visible image. If there is no obstructive material remaining, proceed to operation 230, else proceed to operation 220.

At operation 220, increase the millimeter wave radar power level and capture another millimeter wave radar image. Proceed to operation 215 to incorporate any additional facial features in the composite image.

Figure 3:
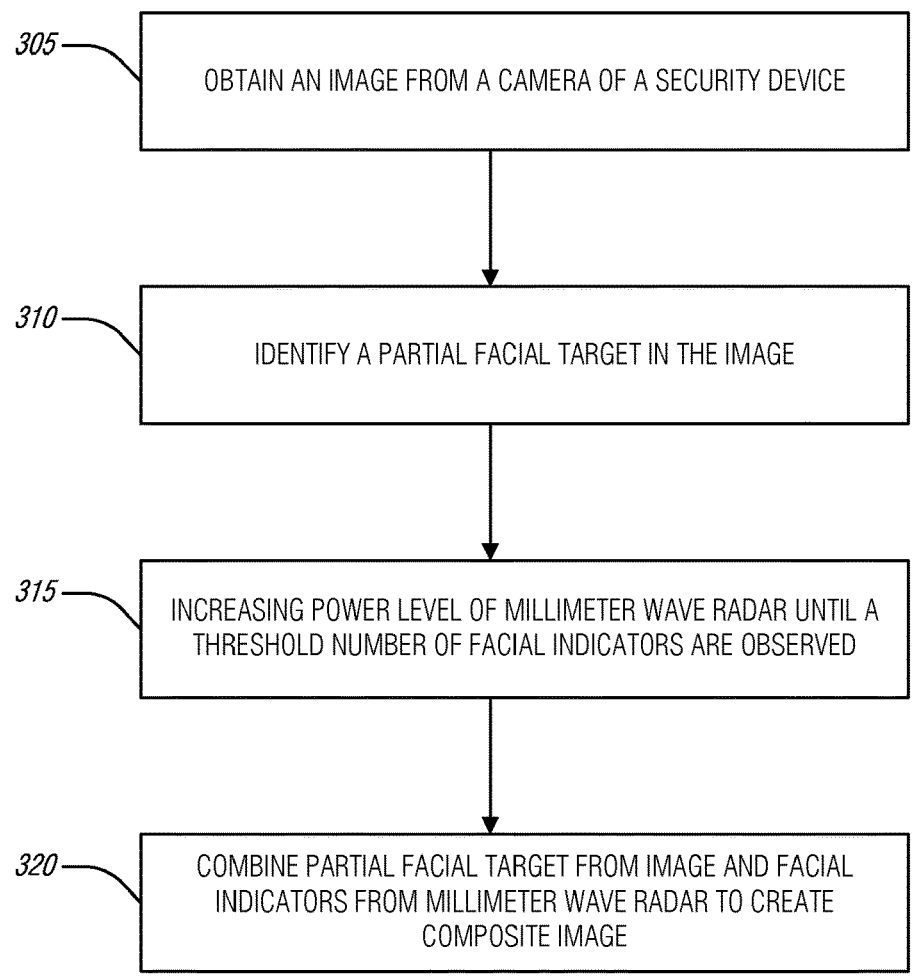
FIG. 3 illustrates a flow diagram of an example of a method for progressive radar assisted facial recognition, according to an embodiment.

FIG. 3 illustrates a flow diagram of an example of a method 300 for progressive radar assisted facial recognition, according to an embodiment. The operations of the method 300 are implemented in computer hardware, such as that described above with respect to FIG. 1, or below with respect to FIG. 4 (e.g., processors, circuit sets, etc.).

At operation 305, an image from a camera of a security device is obtained.

At operation 310, a facial target is identified in the image. Here, the facial target comprises a non-empty set of positive facial indicators. The facial an example, the set of positive facial indicators includes at least one of a shape, relative position of features, surface composition, or reflectivity. In an example, the set of positive facial features includes a member that is a combination of other members of the set of positive facial features.

At operation 315, in response to identifying the facial target, a power level of a millimeter wave radar is increased at least until a threshold number of members of the set of facial indicators are observed. In an example, increasing the power level of the millimeter wave radar is performed stepwise.

In an example, the operations of the method 300 may be extended to include obtaining a plurality of images including the image. In this example, the plurality of images include a set of camera images obtained from the camera and a set of radar images obtained by the millimeter wave radar. In an example, the set of camera images and the set of radar images are in sequence. In this example, obtaining the plurality of images (e.g., operations 305 and 315) includes registering members of the set of camera images and members of the set of radar images to each other in time.

At operation 320, the members of the set of facial indicators that are observed are combined with the set of positive indicators of the face to create a composite image. In an example, described above with respect to image registration between sets of camera images and radar images, the composite image includes a sequence of composite sub-images. Here, a composite sub-image includes a combination of members of the set of camera images and members of the set of radar images within a time period. In an example, the composite image is a combination of the sequence of composite sub-images.

In an example, the operations of the method 300 may be extended to include maintaining an output power level of the millimeter wave radar when not increasing the power level (e.g., operation 315). In an example, maintaining the output power level includes turning off emissions of the millimeter wave radar. In an example, the camera and the millimeter wave radar are packaged together in a composite device (e.g., in the same housing). In an example, the composite device operates without mains power (e.g., via solar, wind, or other power). In an example, the composite device is powered by a battery.

Figure 4:
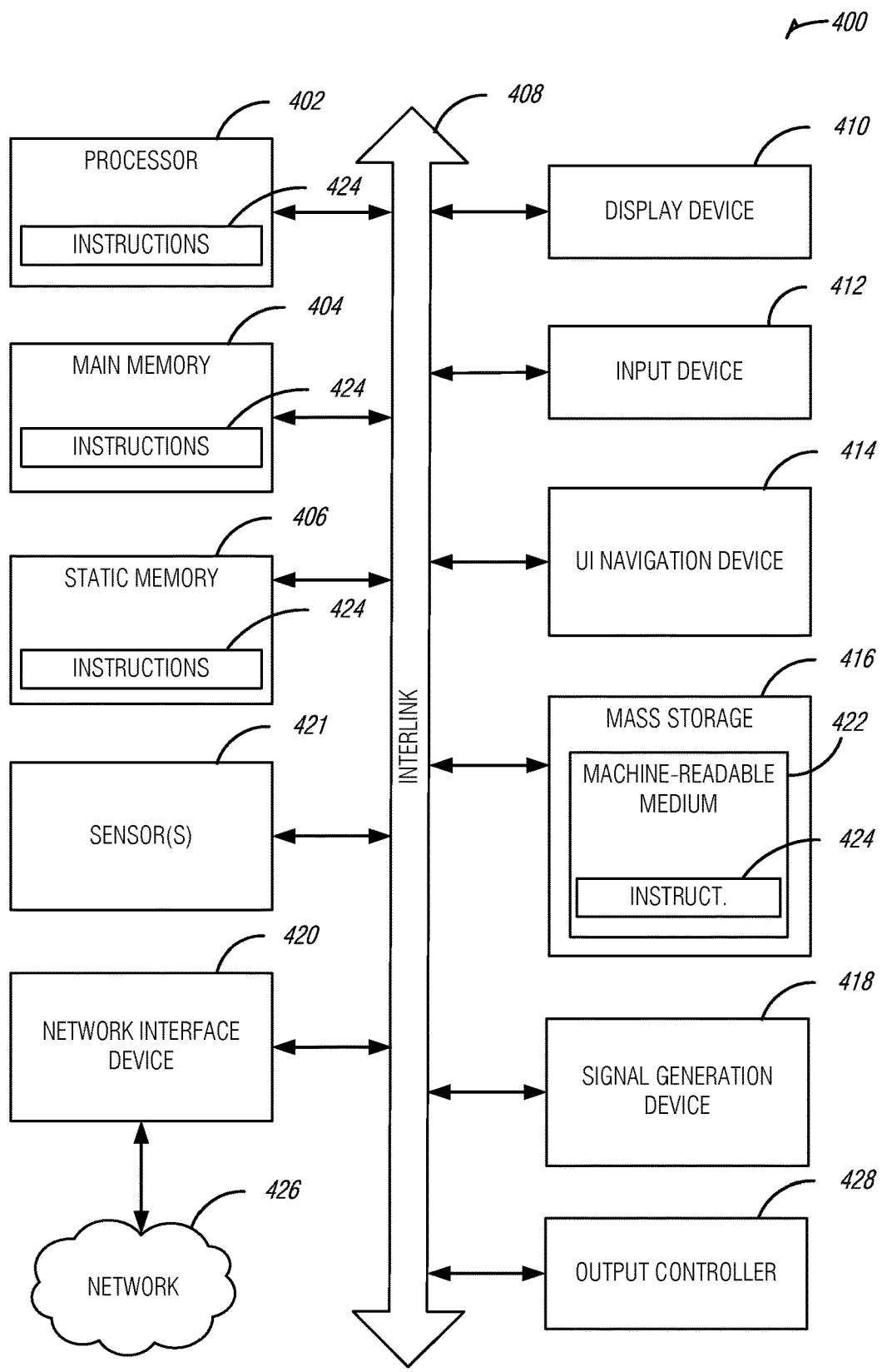
FIG. 4 is a block diagram illustrating an example of a machine upon which one or more embodiments may be implemented.

FIG. 4 illustrates a block diagram of an example machine 400 upon which any one or more of the techniques (e.g., methodologies) discussed herein may perform. In alternative embodiments, the machine 400 may operate as a standalone device or may be connected (e.g., networked) to other machines. In a networked deployment, the machine 400 may operate in the capacity of a server machine, a client machine, or both in server-client network environments. In an example, the machine 400 may act as a peer machine in peer-to-peer (P2P) (or other distributed) network environment. The machine 400 may be a personal computer (PC), a tablet PC, a set-top box (STB), a personal digital assistant (PDA), a mobile telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), other computer cluster configurations.

Examples, as described herein, may include, or may operate by, logic or a number of components, or mechanisms. Circuit sets are a collection of circuits implemented in tangible entities that include hardware (e.g., simple circuits, gates, logic, etc.). Circuit set membership may be flexible over time and underlying hardware variability. Circuit sets include members that may, alone or in combination, perform specified operations when operating. In an example, hardware of the circuit set may be immutably designed to carry out a specific operation (e.g., hardwired). In an example, the hardware of the circuit set may include variably connected physical components (e.g., execution units, transistors, simple circuits, etc.) including a computer readable medium physically modified (e.g., magnetically, electrically, moveable placement of invariant massed particles, etc.) to encode instructions of the specific operation. In connecting the physical components, the underlying electrical properties of a hardware constituent are changed, for example, from an insulator to a conductor or vice versa. The instructions enable embedded hardware (e.g., the execution units or a loading mechanism) to create members of the circuit set in hardware via the variable connections to carry out portions of the specific operation when in operation. Accordingly, the computer readable medium is communicatively coupled to the other components of the circuit set member when the device is operating. In an example, any of the physical components may be used in more than one member of more than one circuit set. For example, under operation, execution units may be used in a first circuit of a first circuit set at one point in time and reused by a second circuit in the first circuit set, or by a third circuit in a second circuit set at a different time.

Machine (e.g., computer system) 400 may include a hardware processor 402 (e.g., a central processing unit (CPU), a graphics processing unit (GPU), a hardware processor core, or any combination thereof), a main memory 404 and a static memory 406, some or all of which may communicate with each other via an interlink (e.g., bus) 408. The machine 400 may further include a display unit 410, an alphanumeric input device 412 (e.g., a keyboard), and a user interface (UI) navigation device 414 (e.g., a mouse). In an example, the display unit 410, input device 412 and UI navigation device 414 may be a touch screen display. The machine 400 may additionally include a storage device (e.g., drive unit) 416, a signal generation device 418 (e.g., a speaker), a network interface device 420, and one or more sensors 421, such as a global positioning system (GPS) sensor, compass, accelerometer, or other sensor. The machine 400 may include an output controller 428, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.).

The storage device 416 may include a machine readable medium 422 on which is stored one or more sets of data structures or instructions 424 (e.g., software) embodying or utilized by any one or more of the techniques or functions described herein. The instructions 424 may also reside, completely or at least partially, within the main memory 404, within static memory 406, or within the hardware processor 402 during execution thereof by the machine 400. In an example, one or any combination of the hardware processor 402, the main memory 404, the static memory 406, or the storage device 416 may constitute machine readable media.

While the machine readable medium 422 is illustrated as a single medium, the term "machine readable medium" may include a single medium or multiple media (e.g., a centralized or distributed database, and/or associated caches and servers) configured to store the one or more instructions 424.

The term "machine readable medium" may include any medium that is capable of storing, encoding, or carrying instructions for execution by the machine 400 and that cause the machine 400 to perform any one or more of the techniques of the present disclosure, or that is capable of storing, encoding or carrying data structures used by or associated with such instructions. Non-limiting machine readable medium examples may include solid-state memories, and optical and magnetic media. In an example, a massed machine readable medium comprises a machine readable medium with a plurality of particles having invariant (e.g., rest) mass. Accordingly, massed machine-readable media are not transitory propagating signals. Specific examples of massed machine readable media may include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; and CD-ROM and DVD-ROM disks.

The instructions 424 may further be transmitted or received over a communications network 426 using a transmission medium via the network interface device 420 utilizing any one of a number of transfer protocols (e.g., frame relay, internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks (e.g., cellular networks), Plain Old Telephone (POTS) networks, and wireless data networks (e.g., Institute of Electrical and Electronics Engineers (IEEE) 802.11 family of standards known as Wi-Fi®, IEEE 802.16 family of standards known as WiMax®), IEEE 802.15.4 family of standards, peer-to-peer (P2P) networks, among others. In an example, the network interface device 420 may include one or more physical jacks (e.g., Ethernet, coaxial, or phone jacks) or one or more antennas to connect to the communications network 426. In an example, the network interface device 420 may include a plurality of antennas to wirelessly communicate using at least one of single-input multiple-output (SIMO), multiple-input multiple-output (MIMO), or multiple-input single-output (MISO) techniques. The term "transmission medium" shall be taken to include any intangible medium that is capable of storing, encoding or carrying instructions for execution by the machine 400, and includes digital or analog communications signals or other intangible medium to facilitate communication of such software.

Additional Notes & Examples

Example 1 is a component for controlling a security device, the component comprising: a camera interface to obtain an image from a camera of the security device; an image processor to identify a facial target in the image, the facial target comprising a non-empty set of positive facial indicators and missing a non-empty set of facial indicators used for identification; a radar controller to increase, in response to identifying the facial target, a power level of a millimeter wave radar at least until a threshold number of members of the set of facial indicators are observed; and an image compositor to combine the members of the set of facial indicators that are observed with the set of positive indicators of the face to create a composite image.

In Example 2, the subject matter of Example 1 optionally includes, wherein the radar controller is to maintain an output power level of the millimeter wave radar when not increasing the power level.

In Example 3, the subject matter of Example 2 optionally includes, wherein to maintain the output power level includes the radar controller to turn off emissions of the millimeter wave radar.

In Example 4, the subject matter of any one or more of Examples 1-3 optionally include, wherein the component, camera, and the millimeter wave radar are packaged together in a composite device.

In Example 5, the subject matter of Example 4 optionally includes, wherein the composite device operates without mains power.

In Example 6, the subject matter of Example 5 optionally includes, wherein the composite device includes a battery by which it is powered.

In Example 7, the subject matter of any one or more of Examples 1-6 optionally include, wherein to increase the power level of the millimeter wave radar the radar controller is to increase the power in discrete steps.

In Example 8, the subject matter of any one or more of Examples 1-7 optionally include, wherein the image processor is to obtain a plurality of images including the image, the plurality of images comprising a set of camera images obtained from the camera and a set of radar images obtained by the millimeter wave radar.

In Example 9, the subject matter of Example 8 optionally includes, wherein the set of camera images and the set of radar images are in sequence, and wherein to obtain the plurality of images includes the image processor to register members of the set of camera images and members of the set of radar images to each other in time.

In Example 10, the subject matter of Example 9 optionally includes, wherein the composite image includes a sequence of composite sub-images, a composite sub-image including a combination of members of the set of camera images and members of the set of radar images within a time period.

In Example 11, the subject matter of Example 10 optionally includes, wherein the composite image is a combination of the sequence of composite sub-images.

In Example 12, the subject matter of any one or more of Examples 1-11 optionally include, wherein the set of positive facial indicators includes at least one of a shape, relative position of features, surface composition, or reflectivity.

In Example 13, the subject matter of Example 12 optionally includes, wherein the set of positive facial features includes a member that is a combination of other member of the set of positive facial features.

Example 14 is a method for controlling a security device, the method comprising: obtaining an image from a camera of the security device; identifying a facial target in the image, the facial target comprising a non-empty set of positive facial indicators and missing a non-empty set of facial indicators used for identification; increasing, in response to identifying the facial target, a power level of a millimeter wave radar at least until a threshold number of members of the set of facial indicators are observed; and combining the members of the set of facial indicators that are observed with the set of positive indicators of the face to create a composite image.

In Example 15, the subject matter of Example 14 optionally includes maintaining an output power level of the millimeter wave radar when not increasing the power level.

In Example 16, the subject matter of Example 15 optionally includes, wherein maintaining the output power level includes turning off emissions of the millimeter wave radar.

In Example 17, the subject matter of any one or more of Examples 14-16 optionally include, wherein the camera and the millimeter wave radar are packaged together in a composite device.

In Example 18, the subject matter of Example 17 optionally includes, wherein the composite device operates without mains power.

In Example 19, the subject matter of Example 18 optionally includes, wherein the composite device is powered by a battery.

In Example 20, the subject matter of any one or more of Examples 14-19 optionally include, wherein increasing the power level of the millimeter wave radar is performed stepwise.

In Example 21, the subject matter of any one or more of Examples 14-20 optionally include obtaining a plurality of images including the image, the plurality of images comprising a set of camera images obtained from the camera and a set of radar images obtained by the millimeter wave radar.

In Example 22, the subject matter of Example 21 optionally includes, wherein the set of camera images and the set of radar images are in sequence, and wherein obtaining the plurality of images includes registering members of the set of camera images and members of the set of radar images to each other in time.

In Example 23, the subject matter of Example 22 optionally includes, wherein the composite image includes a sequence of composite sub-images, a composite sub-image including a combination of members of the set of camera images and members of the set of radar images within a time period.

In Example 24, the subject matter of Example 23 optionally includes, wherein the composite image is a combination of the sequence of composite sub-images.

In Example 25, the subject matter of any one or more of Examples 14-24 optionally include, wherein the set of positive facial indicators includes at least one of a shape, relative position of features, surface composition, or reflectivity.

In Example 26, the subject matter of Example 25 optionally includes, wherein the set of positive facial features includes a member that is a combination of other member of the set of positive facial features.

In Example 27, a system comprising means to perform any of the methods of Examples 14-26.

In Example 28, a machine-readable medium including instructions that, when executed by a machine, cause the machine to perform any of the methods of Examples 14-26.

Example 29 is at least machine readable medium including instructions that, when executed by a machine, cause the machine to perform operations to control a security device, the operations comprising: obtaining an image from a camera of the security device; identifying a facial target in the image, the facial target comprising a non-empty set of positive facial indicators and missing a non-empty set of facial indicators used for identification; increasing, in response to identifying the facial target, a power level of a millimeter wave radar at least until a threshold number of members of the set of facial indicators are observed; and combining the members of the set of facial indicators that are observed with the set of positive indicators of the face to create a composite image.

In Example 30, the subject matter of Example 29 optionally includes, wherein the operations comprise maintaining an output power level of the millimeter wave radar when not increasing the power level.

In Example 31, the subject matter of Example 30 optionally includes, wherein maintaining the output power level includes turning off emissions of the millimeter wave radar.

In Example 32, the subject matter of any one or more of Examples 29-31 optionally include, wherein the camera and the millimeter wave radar are packaged together in a composite device.

In Example 33, the subject matter of Example 32 optionally includes, wherein the composite device operates without mains power.

In Example 34, the subject matter of Example 33 optionally includes, wherein the composite device is powered by a battery.

In Example 35, the subject matter of any one or more of Examples 29-34 optionally include, wherein increasing the power level of the millimeter wave radar is performed stepwise.

In Example 36, the subject matter of any one or more of Examples 29-35 optionally include, wherein the operations comprise obtaining a plurality of images including the image, the plurality of images comprising a set of camera images obtained from the camera and a set of radar images obtained by the millimeter wave radar.

In Example 37, the subject matter of Example 36 optionally includes, wherein the set of camera images and the set of radar images are in sequence, and wherein obtaining the plurality of images includes registering members of the set of camera images and members of the set of radar images to each other in time.

In Example 38, the subject matter of Example 37 optionally includes, wherein the composite image includes a sequence of composite sub-images, a composite sub-image including a combination of members of the set of camera images and members of the set of radar images within a time period.

In Example 39, the subject matter of Example 38 optionally includes, wherein the composite image is a combination of the sequence of composite sub-images.

In Example 40, the subject matter of any one or more of Examples 29-39 optionally include, wherein the set of positive facial indicators includes at least one of a shape, relative position of features, surface composition, or reflectivity.

In Example 41, the subject matter of Example 40 optionally includes, wherein the set of positive facial features includes a member that is a combination of other member of the set of positive facial features.

Example 42 is a system for controlling a security device, the system comprising: means for obtaining an image from a camera of the security device; means for identifying a facial target in the image, the facial target comprising a non-empty set of positive facial indicators and missing a non-empty set of facial indicators used for identification; means for increasing, in response to identifying the facial target, a power level of a millimeter wave radar at least until a threshold number of members of the set of facial indicators are observed; and means for combining the members of the set of facial indicators that are observed with the set of positive indicators of the face to create a composite image.

In Example 43, the subject matter of Example 42 optionally includes maintaining an output power level of the millimeter wave radar when not increasing the power level.

In Example 44, the subject matter of Example 43 optionally includes, wherein maintaining the output power level includes turning off emissions of the millimeter wave radar.

In Example 45, the subject matter of any one or more of Examples 42-44 optionally include, wherein the camera and the millimeter wave radar are packaged together in a composite device.

In Example 46, the subject matter of Example 45 optionally includes, wherein the composite device operates without mains power.

In Example 47, the subject matter of Example 46 optionally includes, wherein the composite device is powered by a battery.

In Example 48, the subject matter of any one or more of Examples 42-47 optionally include, wherein increasing the power level of the millimeter wave radar is performed stepwise.

In Example 49, the subject matter of any one or more of Examples 42-48 optionally include obtaining a plurality of images including the image, the plurality of images comprising a set of camera images obtained from the camera and a set of radar images obtained by the millimeter wave radar.

In Example 50, the subject matter of Example 49 optionally includes, wherein the set of camera images and the set of radar images are in sequence, and wherein obtaining the plurality of images includes registering members of the set of camera images and members of the set of radar images to each other in time.

In Example 51, the subject matter of Example 50 optionally includes, wherein the composite image includes a sequence of composite sub-images, a composite sub-image including a combination of members of the set of camera images and members of the set of radar images within a time period.

In Example 52, the subject matter of Example 51 optionally includes, wherein the composite image is a combination of the sequence of composite sub-images.

In Example 53, the subject matter of any one or more of Examples 42-52 optionally include, wherein the set of positive facial indicators includes at least one of a shape, relative position of features, surface composition, or reflectivity.

In Example 54, the subject matter of Example 53 optionally includes, wherein the set of positive facial features includes a member that is a combination of other member of the set of positive facial features.

The above detailed description includes references to the accompanying drawings, which form a part of the detailed description. The drawings show, by way of illustration, specific embodiments that may be practiced. These embodiments are also referred to herein as "examples." Such examples may include elements in addition to those shown or described. However, the present inventor also contemplates examples in which only those elements shown or described are provided. Moreover, the present inventor also contemplates examples using any combination or permutation of those elements shown or described (or one or more aspects thereof), either with respect to a particular example (or one or more aspects thereof), or with respect to other examples (or one or more aspects thereof) shown or described herein.

All publications, patents, and patent documents referred to in this document are incorporated by reference herein in their entirety, as though individually incorporated by reference. In the event of inconsistent usages between this document and those documents so incorporated by reference, the usage in the incorporated reference(s) should be considered supplementary to that of this document; for irreconcilable inconsistencies, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended, that is, a system, device, article, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

The above description is intended to be illustrative, and not restrictive. For example, the above-described examples (or one or more aspects thereof) may be used in combination with each other. Other embodiments may be used, such as by one of ordinary skill in the art upon reviewing the above description. The Abstract is to allow the reader to quickly ascertain the nature of the technical disclosure and is submitted with the understanding that it will not be used to interpret or limit the scope or meaning of the claims. Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the Detailed Description, with each claim standing on its own as a separate embodiment. The scope of the embodiments should be determined with reference to the appended claims, along with the full scope of equivalents to which such claims are entitled.

What is claimed is:

1. A component for controlling a security device, the component comprising:
    a camera interface to obtain an image from a camera of the security device;
    an image processor to identify a facial target in the image, the facial target comprising a non-empty set of positive facial indicators and a non-empty set of missing facial indicators used for identification, the set of missing facial indicators being a difference between the of positive facial indicators and a number and type of facial indicators for successful facial recognition as defined by a parameter set;
    a radar controller to increase, in response to identifying the facial target, a power level of a millimeter wave radar at least until a threshold number of members of the set of missing facial indicators are observed from radar images by at least one of the image processor, the radar controller, or an image compositor; and
    the image compositor to combine the members of the set of facial indicators that pare observed with the set of positive indicators of the face to create a composite image.

2. The component of claim 1, wherein the radar controller is to maintain an output power level of the millimeter wave radar when not increasing the power level.

3. The component of claim 2, wherein to maintain the output power level includes the radar controller to turn off emissions of the millimeter wave radar.

4. The component of claim 1, wherein the component, camera, and the millimeter wave radar are packaged together in a composite device.

5. The component of claim 1, wherein the image processor is to obtain a plurality of images including the image, the plurality of images comprising a set of camera images obtained from the camera and a set of radar images obtained by the millimeter wave radar.

6. The component of claim 5, wherein the set of camera images and the set of radar images are in sequence, and wherein to obtain the plurality of images includes the image; processor to register members of the set of camera images and members of the set of radar images to each other in time.

7. The component of claim 1, wherein the set of positive facial indicators includes at least one of a shape, relative position of features, surface composition, or reflectivity.

8. The component of claim 7, wherein the set of positive facial indicators includes a member that is a combination of another member of the set of positive facial features.

9. A method for controlling a security device, the method comprising:
    obtaining an image from a camera of the security device;
    identifying a facial target in the image, the facial target comprising a non-empty set of positive facial indicators and a non-empty set of missing facial indicators used for identification, the set of missing facial indicators being a difference between the of positive facial indicators and a number and type of facial indicators for successful facial recognition as defined by a parameter set;
    increasing, in response to identifying the facial target, a power level of a millimeter wave radar at least until a threshold number of members of the set of missing facial indicators are observed from radar images by at least one of an image processor, a radar controller, or an image compositor; and combining the members of the set of facial indicators that are observed with the set of positive indicators of the face to create a composite image.

10. The method of claim 3, comprising maintaining an output power level of the millimeter wave radar when not increasing the power level.

11. The method of claim 10, wherein maintaining the output power level includes turning off emissions of the millimeter wave radar.

12. The method of claim 9, wherein the camera and the millimeter wave radar are packaged together in a composite device.

13. The method of claim 9, comprising obtaining a plurality of images including the image, the plurality of images comprising a set of camera images obtained from the camera and a set of radar images obtained by the millimeter wave radar.

14. The method of claim 13, wherein the set of camera images and the set of radar images are in sequence, and wherein obtaining the plurality of images includes registering members of the set of camera images and members of the set of radar images to each other in time.

15. The method of claim 9, wherein the set f positive facial indicators includes at least one of a shape, relative position of features, surface composition, or reflectivity.

16. The method of claim 15, wherein the set of positive facial indicators includes a member that is a combination of another member of the set of positive facial features.

17. At least one non-transitory machine readable medium including instructions that, when executed by a machine, cause the machine to perform operations to control a security device, the operations comprising:

obtaining an image from a camera of the security device;

identifying a facial target in the image, the facial target comprising a non-empty set of positive facial indicators and missing a non-empty set of facial indicators used for identification, the set of missing facial indicators being a difference between the of positive facial indicators and a number and type of facial indicators for successful facial recognition as defined by a parameter set;

increasing, in response to identifying the facial target, a power level of a millimeter wave radar at least until a threshold number of members of the set of missing facial indicators are observed from radar images by at least one of an image processor, a radar controller, or an image compositor; and combining the members of the set of facial indicators that are observed with the set of positive indicators of the face to create a composite image.

18. The at least one non-transitory machine readable medium of claim 17, wherein the operations comprise maintaining an output power level of the millimeter wave radar when not increasing the power level.

19. The at least one non-transitory machine readable medium of claim 18, wherein maintaining the output power level includes turning off emissions of the millimeter wave radar.

20. The at least one non-transitory machine readable medium of claim 17, wherein the camera and the millimeter wave radar are packaged together in a composite device.

21. The at least one non-transitory machine readable medium of claim 17, wherein the operations comprise obtaining a plurality of images including the image, the plurality of images comprising a set of camera images obtained from the camera and a set of radar images obtained by the millimeter wave radar.

22. The at least one non-transitory machine readable medium of claim 21, wherein the set of camera images and the set of radar images are in sequence, and wherein obtaining the plurality of images includes registering members of the set of camera images and members of the set of radar images to each other in time.

23. The at least one non-transitory machine readable medium of claim 17, wherein the set of positive facial indicators includes at least one of a shape, relative position of features, surface composition, or reflectivity.

24. The at least one non-transitory machine readable medium of claim 23, wherein the set of positive facial indicators includes a member that is a combination of another member of the set of positive facial features.

* * * * *

UNITED STATES PATENT AND TRADEMARK OFFICE
CERTIFICATE OF CORRECTION

PATENT NO. : 10,102,419 B2
APPLICATION NO. : 14/927739
DATED : October 16, 2018
INVENTOR(S) : Mark A Allyn Page 1 of 1

It is certified that error appears in the above-identified patent and that said Letters Patent is hereby corrected as shown below:

In the Claims

In Column 14, Line 15, in Claim 1, after "the", delete "of"

In Column 14, Line 26, in Claim 1, delete "pare" and insert --are-- therefor

In Column 14, Line 45, in Claim 6, delete "image;" and insert --image-- therefor In Column 14, Line 61, in Claim 9, after "the", delete "of"

In Column 15, Line 7, in Claim 10, delete "claim 3," and insert --claim 9,-- therefor In Column 15, Line 26, in Claim 15, delete "f" and insert --of-- therefor In Column 15, Line 41, in Claim 17, after "the", delete "of"

Signed and Sealed this
Twenty-first Day of April, 2020

Andrei Iancu
*Director of the United States Patent and Trademark Office*